March 31, 1931.  A. C. THOMPSON  1,799,073
CATTLE HOLDING AND DEHORNING GATE
Filed Aug. 22, 1927
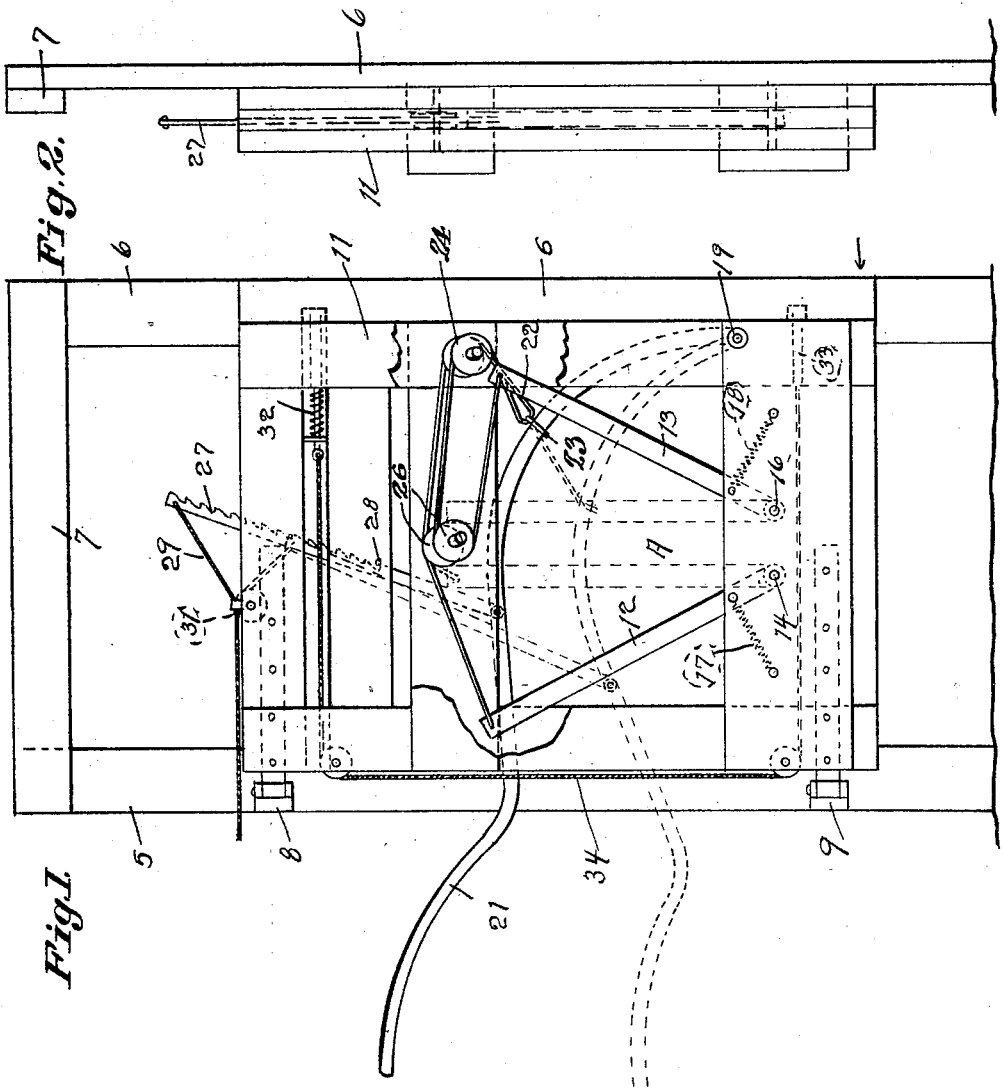
Inventor.
A.C. Thompson
By Victor J. Evans
Attorney.

Patented Mar. 31, 1931

1,799,073

UNITED STATES PATENT OFFICE

ANDREW C. THOMPSON, OF PORTERVILLE, CALIFORNIA

CATTLE HOLDING AND DEHORNING GATE

Application filed August 22, 1927. Serial No. 214,696.

This invention relates to improvements in cattle holding and de-horning gates.

The principal object of this invention is to produce a gate wherein the head of any cattle to be operated upon, may be securely held during the operation, and later released without injury to the person performing the operation.

Another object is to provide simple and efficient means whereby the animal may be permitted to pass through the gate after its head has been released.

A further object of this invention is to produce a device of this character which is economical to manufacture and positive in operation.

Other objects and advantages will be apparent during the course of the following description.

In the accompanying drawings forming a part of this specification, and in which like numerals are employed to designate like parts throughout the same, Figure 1 is a front elevation of my improved gate, Figure 2 is a side elevation looking in the direction of the arrow of Figure 1.

In de-horning cattle, it is necessary to hold the animal being operated upon, particularly its head. This is often done by roping the animal to a fence or other solid object, after which it is necessary to unrope the animal which is a dangerous operation and the person doing the roping is very apt to be injured.

To overcome this disadvantage, I have provided a gate wherein the head of the animal may be securely held during the operation and later released without subjecting the operator in any way to the liability of being injured.

In the accompanying drawing wherein for the purpose of illustration is shown a preferred embodiment of my invention, the numerals 5 and 6 refer to gate posts secured together by a lintel 7. To the post 5 I secure hinges 8 and 9 which serve to hingedly support a gate designated as a whole by the numeral 11. The gate 11 is constructed of slats in such a manner that an opening A is provided therein. It is through this opening that the cattle pass their heads.

In order to hold the head of the animal therein, I have provided pivoted bars 12 and 13, pivoted as at 14 and 16, respectively. Springs 17 and 18 serve to hold the bars 12 and 13 respectively, in open position.

Pivoted as at 19 is an operating lever 21 which also serves as a head depresser as will be later seen. This operating lever has a rope 22 the middle portion of which is secured to the link 23 while the ends pass over pulleys 24 and 26, one end being secured to the upper extremity of the bar 12, while the other end of the rope is secured to the upper extremity of the bar 13.

The result of this construction is that when the operating lever 21 is moved downwardly to the dotted line position of Figure 1, a pull upon the cable 22 will cause the bars 12 and 13 to assume their dotted line position, thus securely fastening the head of the animal therebetween, which head is depressed by the operating lever 21.

In order to hold the operating lever 21 in lowered position I provide a locking bar 27 which has teeth adapted to engage a pin 28 carried in the gate.

A rope 29 is secured to the upper extremity of the locking bar and passes over a pulley 31 so as to have its free end adjacent the operator.

At 32 and 33 I have shown spring bolts which are operated by a rope 34. These spring bolts serve to maintain the gate as a whole in locked position. The rope 34 is always adjacent the operator and therefore convenient to operate.

The manner of using my device is as follows:—

The gate is closed and the animal to be dehorned is driven into the stall back of the gate so that its head projects through the space A of the gate, after which the operator depresses the lever 21 thus moving the bars 12 and 13 against the neck of the animal, while the lever 21 depresses upon the top of the neck and holds the head in relatively immovable position.

After the de-horning operation has been completed, the rope 29 is pulled which releases the bar 27 which will immediately move to its full line position of Figure 1 through the effect of the springs 17 and 18. As soon as this occurs, the animal will pull its head out of the gate and the operator then pulls the rope 34 permitting the gate as a whole to spring thereby releasing the animal.

It will thus be seen that I have provided a very simple arrangement whereby the objects and advantages herein set forth will be realized.

It is to be understood that the form of my invention herewith shown and described is to be taken as a preferred example of the same and that various changes relative to the material, shape, size, and arrangement of parts may be resorted to without departing from the spirit of the invention or the scope of the subjoined claim.

Having thus described my invention, I claim:—

In a gate of the character described, having an opening formed therein, a pair of bars pivoted to said gate so as to lie within the opening in the gate, an operating lever pivoted to said gate and having a portion thereof overlying the opening in said gate, a cable having its opposite ends secured to the upper extremity of said pivoted members and having its middle portion slidably secured to said operating lever, a pivoted member secured to said operating lever, said pivoted member having teeth formed thereon, a pin secured in said gate and adapted to be engaged by said teeth for the purpose specified.

In testimony whereof I affix my signature.

ANDREW C. THOMPSON.